US007027515B2

United States Patent
Lin (10) Patent No.: US 7,027,515 B2
(45) Date of Patent: Apr. 11, 2006

(54) SUM-OF-ABSOLUTE-DIFFERENCE CHECKING OF MACROBLOCK BORDERS FOR ERROR DETECTION IN A CORRUPTED MPEG-4 BITSTREAM

(75) Inventor: Tao Lin, Shanghai (CN)

(73) Assignee: Red Rock Semiconductor Ltd., Sunnyvale, CA (US)

( * ) Notice: Subject to any disclaimer, the term of this patent is extended or adjusted under 35 U.S.C. 154(b) by 655 days.

(21) Appl. No.: 10/065,404

(22) Filed: Oct. 15, 2002

(65) Prior Publication Data

US 2004/0071217 A1  Apr. 15, 2004

(51) Int. Cl.
H04N 7/12 (2006.01)
(52) U.S. Cl. .................................. 375/240.25
(58) Field of Classification Search ................ 348/351, 348/425.2, 466; 375/240.25, 240.27, 240.24, 375/240.12; 382/268, 267, 262, 266, 309
See application file for complete search history.

(56) References Cited

U.S. PATENT DOCUMENTS

2003/0016864 A1 *  1/2003  McGee et al. .............. 382/165
2003/0026343 A1 *  2/2003  Kim et al. .............. 375/240.27
2003/0048208 A1 *  3/2003  Karczewicz .................. 341/67

* cited by examiner

*Primary Examiner*—Vu Le
*Assistant Examiner*—Behrooz Senfi
(74) *Attorney, Agent, or Firm*—Stuart T. Auvinen (57) ABSTRACT

An MPEG decoder verifies a previous video packet by calculating the sum-of-the-absolute differences (SAD) for macroblock boundaries. When a macroblock counter goes off count, the macroblocks can be placed in the wrong relative locations in a frame. Image shapes are sliced when macroblock misplacement occurs, creating many new bisecting edges along macroblock boundaries. These image discontinuities along macroblock boundaries have a large SAD for pixels on either side of the macroblock boundary. The SAD is generated along the left and upper edges of a current macroblock, and a maximum SAD of all macroblocks in the previous video packet is generated. When the maximum SAD is above a threshold, the macroblock counter is likely to be in error, and the macroblock counter is reloaded with the header macroblock number from the next packet header. When the SAD is below threshold, a mis-matching header macroblock number is ignored.

20 Claims, 10 Drawing Sheets

SUM-OF-ABSOLUTE-DIFFERENCE CHECKING OF MACROBLOCK BORDERS FOR ERROR DETECTION IN A CORRUPTED MPEG-4 BITSTREAM

BACKGROUND OF INVENTION

This invention relates to video compression, and more particularly to error recovery from macroblock location errors.

Multimedia-rich personal computers (PC's) and various other computing devices have delivered video feeds to users over the Internet. Processing of video bitstreams or feeds is among the most data-intensive of all common computing applications. Limited communication-line bandwidth limits the quality of Internet video, which is often delivered in small on-screen windows with jerky movement.

To mitigate the problems of large video streams, various video-compression techniques have been deployed. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Portable hand-held devices such as personal-digital-assistants and cellular telephones are widely seen today. Wireless services allow these devices to access data networks and even view portions of web pages. Currently the limited bandwidth of these wireless networks limits the web viewing experience to mostly text-based portions of web pages. However, future wireless networks are being planned that should have much higher data transmission rates, allowing graphics and even video to be transmitted to portable computing and communication devices.

Although proponents of these next-generation wireless networks believe that bandwidths will be high enough for high-quality video streams, the actual data rates delivered by wireless networks can be significantly lower than theoretical maximum rates, and can vary with conditions and local interference. Due to its high data requirements, video is likely to be the most sensitive service to any reduced data rates. Interference can cause intermittent dropped data over the wireless networks.

Next-generation compression standards have been developed for transmitting video over such wireless networks. The MPEG-4 standard provides a more robust compression technique for transmission over wireless networks. Recovery can occur when parts of the MPEG-4 bitstream is corrupted.

Figure 1:
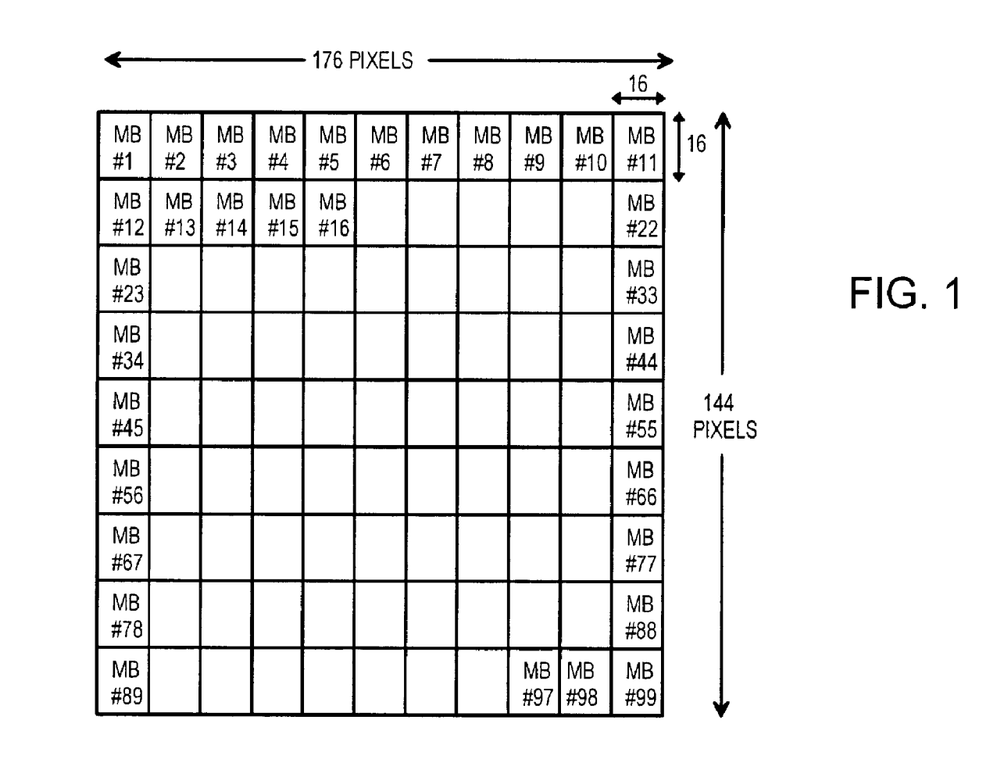
FIG. 1 shows that an image frame is divided into rows and columns of macroblocks.

FIG. 1 shows that an image frame is divided into rows and columns of macroblocks. The MPEG standard uses a divide-and-conquer technique in which the video sequence is divided into individual image frames known as video object planes (VOPs), and each frame is divided into rows and columns of macroblocks. Each macroblock is a rectangle of 16 by 16 pixels.

Various window sizes and image resolutions can be supported by MPEG standards. For example, one common format is an image frame of 176 by 144 pixels. The image frame is divided into 9 rows of macroblocks, with each row having 11 macroblocks. A total of 99 macroblocks are contained in each frame.

The macroblocks are arranged in a predetermined order, starting in the upper left with the first macroblock (MB #1). The second macroblock, MB#2, is to the right of MB#1 in the first row, followed by macroblocks #3 to MB#11 in the first row. The second row contains MB#12 to MB#22. The last row contains MB#89 to MB#99. Of course, other image sizes and formats can have the macroblocks in rows of various lengths, and various numbers of rows.

When an image frame is encoded, each macroblock is encoded in order, starting with MB#1 in the first row, and continuing with MB#2 to MB#11 in the first row, then MB#12 to MB#22 in the second row, and on until the last row with MB#89 to MB#99. The macroblocks are arranged in the bitstream into one or more video packets (VP). Each video packet contains a header, allowing for some error recovery to occur. For example, the number of the next macroblock in the frame, which is the first macroblock in the new video packet, is included in the VP header.

Figure 2:
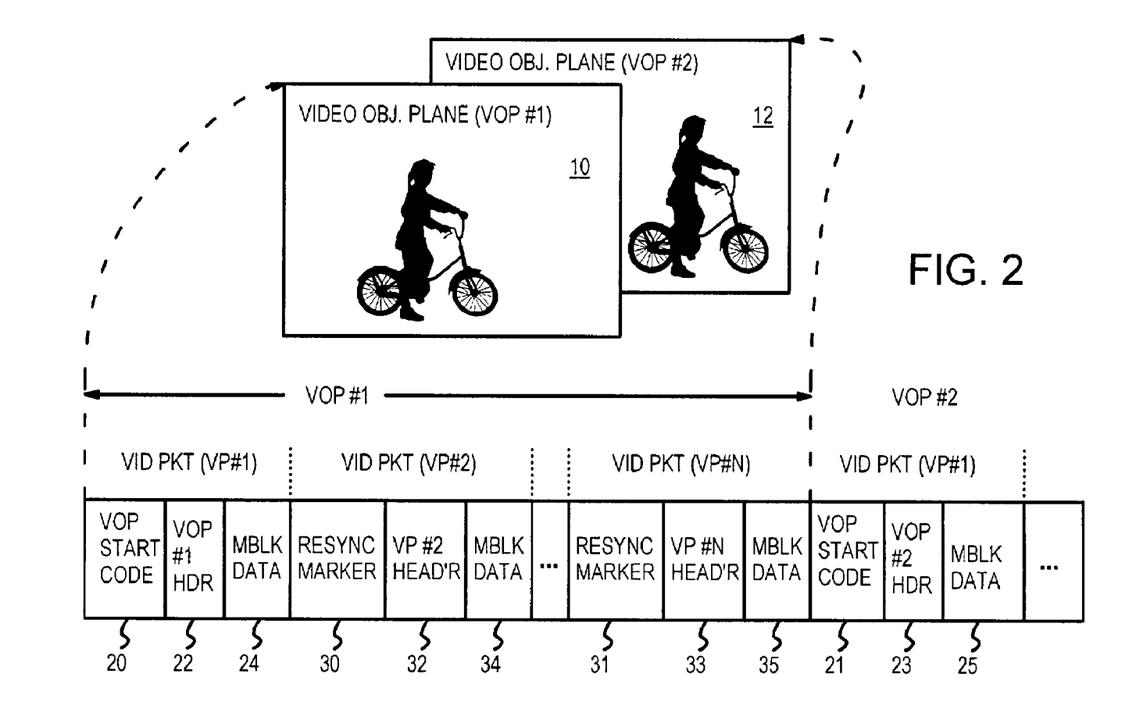
FIG. 2 shows a MPEG-4 bitstream that is composed of video object planes and video packets.

FIG. 2 shows a MPEG-4 bitstream that is composed of video object planes and video packets. The video is sent as a series of picture frames known as video object planes (VOP). These picture frames are replaced at a fixed rate, such as every 30 milliseconds to give the illusion of picture movement. Rather than transmit every pixel on each line, the picture is divided into macroblocks and compressed by searching for similar macroblocks in earlier or later frames. The macroblock can then be replaced with a motion vector or pixel changes.

Video object planes VOP 10, 12 are two frames in a sequence of many frames that form a video stream. Pixel data in these planes are compressed using macroblock-compression techniques that are well-known and defined by the MPEG-4 standard. The compressed picture data is divided into several video packets (VP) for each video object plane VOP.

Each video object plane begins with a VOP start code, such as VOP start code 20 which begins VOP #1 (10), an VOP start code 21, which begins VOP #2 (12). First video object plane VOP 10 has VOP header 22 that follows VOP start code 20, and data field 24 which contains the beginning of the picture data for VOP 10. After a predetermined number of macroblocks or amount of data, such as 100 to 1000 bits, a new video packet begins with resync marker 30 and VP header 32. Data field 34 continues with the picture data for several more macroblocks of VOP 10. Other video packets follow, each beginning with a resync marker and VP header, followed by a data field with more macroblocks of picture data for VOP 10. The last video packet VP #N in VOP 10 begins with resync marker 31 and VP header 33, and is followed by the final macroblocks for VOP 10, in data field 35.

The second video object plane VOP 12 begins with VOP start code 21 and VOP header 23, and is followed by data field 25, which has the first macroblocks of picture data for the second picture frame, VOP 12. Other video packets follow for VOP 12 with the other macroblocks.

The VOP headers include a VOP coding type (I for Intra-coded, no prediction, P for prediction from Previous VOP, B for Bi-directional prediction from previous and next VOPs), VOP time, rounding type, quantization scale, f_code, while the VP headers include a macroblock number for the first macroblock in the packet, quantization scale, VOP coding type and time. The headers can include other information as well.

The VOP start codes and VP resync markers contain unique bit patterns that do not occur in the headers or data fields. The start code begins with a string of 23 zero bits. The picture data in the macroblock data fields are encoded so that they never have such a long string or run of zero bits. Likewise, the headers do not have such a long run of zero bits. Thus the start code is unique within the video bitstream, allowing a bitstream decoder to easily detect the start code.

Figure 3:
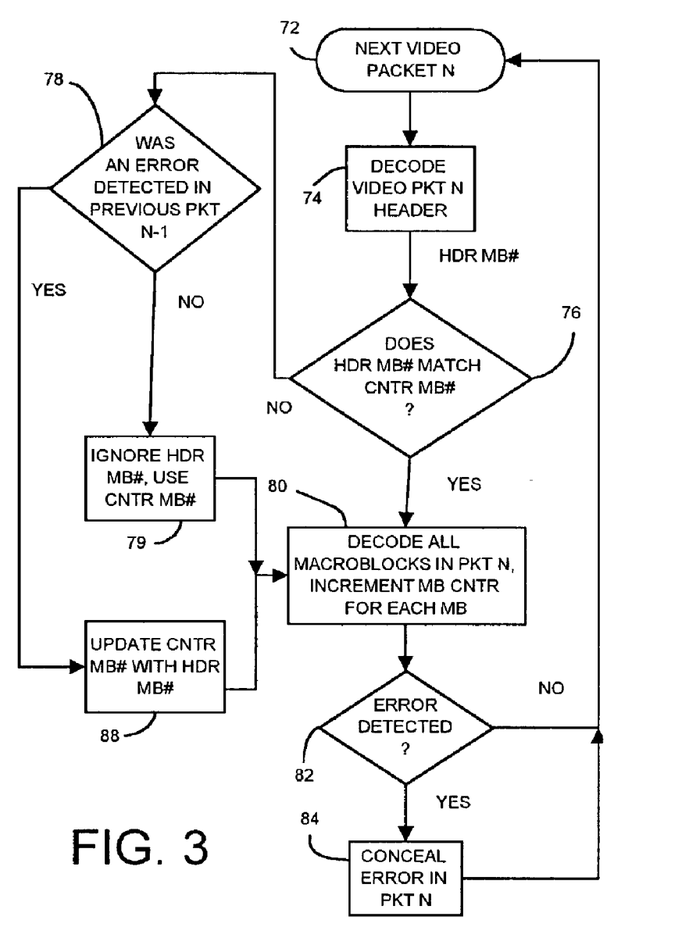
FIG. 3 is a flowchart for macroblock counting and decoding.

FIG. 3 is a flowchart for macroblock counting and decoding. For each VOP or frame, the MPEG decoder decodes one macroblock after another in order. The macroblocks do not themselves contain a macroblock number or identifier. Instead, a macroblock counter in the decoder is incremented for each macroblock processed. The macroblock counter thus keeps track of which macroblock is being decoded.

Each video packet header also contains a macroblock number for the next macroblock in the new packet. This header macroblock number can be compared to the macroblock counter as a check. The first video packet in a frame has a VOP header rather than a VP header. The macroblock counter is reset for each new VOP, so a macroblock number is not needed for the first packet of each frame.

A new video packet N is detected when a resync marker is found in the bitstream, step 72. The VP header that follows the resync marker is decoded, step 74. This header contains the header macroblock number, which is the number for the first macroblock in the new video packet N. When the video packet is the first video packet in a frame, the header macroblock number is implied to be one, the same value as the reset or initialized macroblock counter.

The decoder compares the header macroblock number that was just read from the VP header to the macroblock counter value, step 76. Most of the time, the values match. Decoding of all the macroblocks in the video packet can proceed, step 80. The macroblock counter is incremented for each macroblock processed.

When an error is detected when decoding the macroblocks in video packet N, step 82, then the decoder may conceal the error, step 84. Errors can be concealed by using pixels from a previous frame rather than the pixels, error terms, or motion vectors encoded with the macroblocks in the video packet.

When no decoding errors are detected, and all the macroblocks in packet N have been processed, then decoding can continue with the next video packet, step 72.

Occasionally, the header macroblock number does not match the macroblock counter, step 76. Some kind of error has occurred. When the previous video packet N-1 had a decoding error, step 78, then the error may have caused the macroblock counter to get off count. The header macroblock number is assumed to be correct and the macroblock counter wrong. The header macroblock number in the new video packet N is used to over-write or update the macroblock counter. The header macroblock number is thus loaded into the macroblock counter, step 88. The macroblock counter is then incremented for each macroblock decoded in the current video packet N, step 80.

When the previous packet N-1 did not have a detected decoding error, step 78, then the macroblock counter is probably correct. Perhaps the error is in the new VP header, causing the header macroblock number to be read incorrectly. The header macroblock number is ignored or discarded, while the macroblock counter is used without any update, step 79. The macroblock counter is then incremented for each macroblock decoded in the current video packet N, step 80.

Another error may be detected when decoding the macroblocks in video packet N, step 82. The decoder may conceal the error, step 84, by using pixels from a previous frame rather than the pixels, error terms, or motion vectors encoded with the macroblocks in the current video packet N.

Figure 4A:
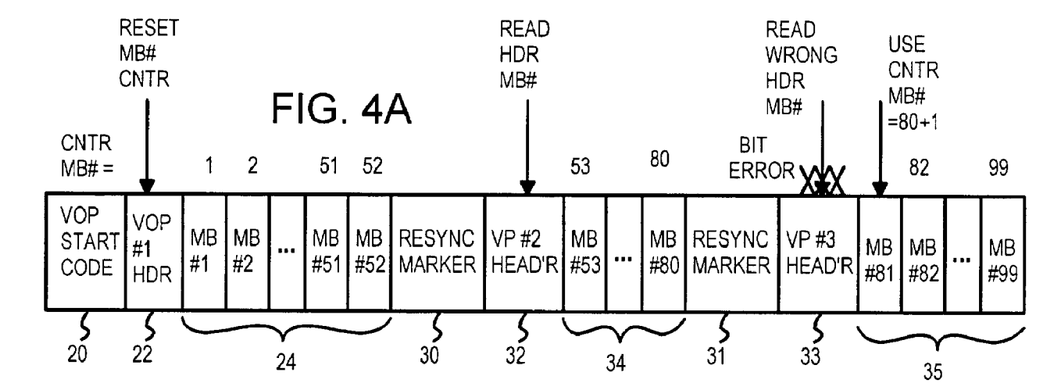
FIG. 4A shows recovery from a bit error in the header macroblock number.

FIG. 4A shows recovery from a bit error in the header macroblock number. When the bitstream is transmitted over a wireless network, some corruption of the data is possible. In this example, a bit error occurs in the bitstream in VP header 33, causing an incorrect header macroblock number to be read.

The VOP frame begins with start code 20 and VOP header 22. The macroblock counter is reset to 1 (or 0 if the first MB is considered to be MB#0) at the start of each new VOP. The macroblock counter is incremented for each macroblock in data field 24. The counter can be pre- or post-incremented with each macroblock, depending on the exact counter timing used and any pipelining. As the last macroblock (MB#52) in data field 24 is processed, the macroblock counter reads 52. The macroblock counter is then incremented to 53 before the next macroblock (MB#53) in data field 34 is processed.

The next resync marker 30 begins video packet #2. VP header 32 following resync marker 30 is decoded. VP header 32 contains the header macroblock number 53, since the first macroblock in this packet is MB#53. Since the macroblock counter and the header macroblock number match, no error is detected and data processing resumes with data field 34 in the second video packet. The macroblock counter is incremented for each macroblock in data field 34, from MB#53 to MB#80.

Resync marker 31 is detected for the third video packet. VP header 33 is decoded, and the new header macroblock number is read and compared to the macroblock counter value. The macroblock counter is pre-incremented from 80 to 81, ready for MB#81 as the next macroblock.

However, a bit error occurs in VP header 33. The header macroblock number is corrupted so that the wrong value is read. Although the MPEG encoder wrote the correct value 81 to VP header 33, the bit error caused a different number, such as 33 or 75, to be read. This wrong header macroblock number does not match the macroblock counter value of 81.

Since no error was detected in the previous video packet (#2), the macroblock counter is assumed to be correct and the header macroblock number is assumed to be wrong. The header macroblock number is ignored and the macroblock counter is used for identifying the macroblocks in data field 35. Data processing continues with macroblocks MB#81 to MB#99 in data field 25. The macroblock counter is incremented for each macroblock in data field 25.

Correctly guessing that the header macroblock number was wrong reduces the amount of lost data when a bitstream error occurs. Decoding of macroblocks can proceed without any error when the only error was the header macroblock number.

Figure 4B:
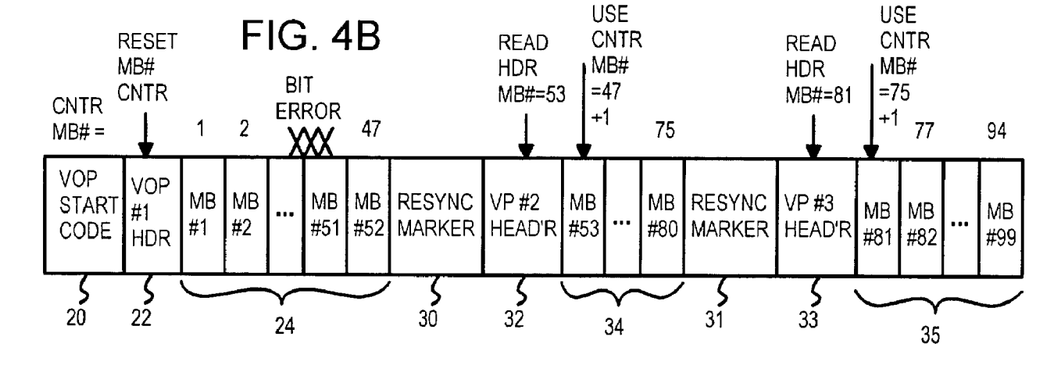
FIG. 4B shows an undetected bit error in the macroblock data that corrupts the macroblock counter.

Unfortunately, an incorrect guess for other kinds of bit errors is more difficult to recover from. FIG. 4B shows an undetected bit error in the macroblock data that corrupts the macroblock counter. Although start code 20 and VOP header 22 for VOP #1 are detected and decoded, a bit error in macroblock data in data field 24 occurs.

Some of the early macroblocks MB#1, MB#2 . . . in data field 24 are properly decoded, but an error occurs before the last macroblock MB#52 in data field 24 is processed. This error is not detected, but the start of some of the macroblocks in data field 24 is not recognized. The decoder combines several macroblocks of data together into a single corrupted macroblock.

Since some of the macroblocks in data field 24 are not recognized, the macroblock counter is not incremented enough times. The macroblock counter is only incremented for recognized macroblocks. In this example, the macroblock counter is off by 5, reading 47 for the last macroblock MB#52 in data field 24.

Resync marker 30 for the second video packet (VP) is detected, and VP header 32 is decoded. A correct value of 53 is read from VP header 32 as the header macroblock number.

The macroblock counter is pre-incremented from 47 to 48, but does not match the header macroblock number of 53. An error is detected. However, since the bit error in data field 24 was not detected, the macroblock counter is assumed to be correct and the header macroblock number is assumed to be wrong and is ignored. This is a decoder mistake.

Macroblocks MB#53 to MB#80 in data field 34 are decoded, but as interpreted as macroblocks MB#48 to MB#75. The macroblock counter is incremented for each macroblock, but starts out the video packet with the incorrect value of 48.

Resync marker 31 is detected, and VP #3 header 33 is decoded. The header macroblock number of 81 is read from VP header 33, but the macroblock counter reads 76 once it is pre-incremented. Since no error was detected in the previous video packet #2, the decoder assumes that the macroblock counter is correct and the header macroblock number is wrong. This is an incorrect assumption by the decoder.

Macroblock MB#81 is interpreted by the decoder as MB#76, since the macroblock counter reads 76. Macroblocks MB#82 to MB#99 are interpreted incorrectly as macroblocks #77 to #94. The decoder finally recovers when the macroblock counter is reset the by start code for the next VOP #2.

What is desired is a bitstream decoder that more accurately responds to mis-matches in the macroblock number. A robust decoder is desired that can more quickly recover from bitstream errors. An MPEG-4 decoder that can recover from a corrupted bitstream and mis-matching macroblock number is desirable to minimize loss of picture data. An MPEG-4 decoder that can more accurately choose either the header macroblock number or the macroblock counter value when a mismatch occurs is desired.

DETAILED DESCRIPTION

The present invention relates to an improvement in macroblock tracking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor realizes that better error recovery from macroblock sequencing errors could be accomplished if it is known whether the macroblock counter or the header macroblock number is wrong when a mismatch occurs. Although it may not be know for certainty which value is in error, the inventor realizes that the image itself can be used to more accurately decide which macroblock number is in error.

The inventor further recognizes that the macroblock boundaries are arbitrary divisions of the image itself. These macroblock boundaries frequently cross through image shapes. When macroblocks are arranged in proper order, the macroblock boundaries are unlikely to also be boundaries of image shapes. Sharp discontinuities at macroblock boundaries are likely to indicate a decoding error. The inventor checks macroblock boundaries for such sharp discontinuity to further detect when a macroblock decoding error has occurred.

Figure 5A:
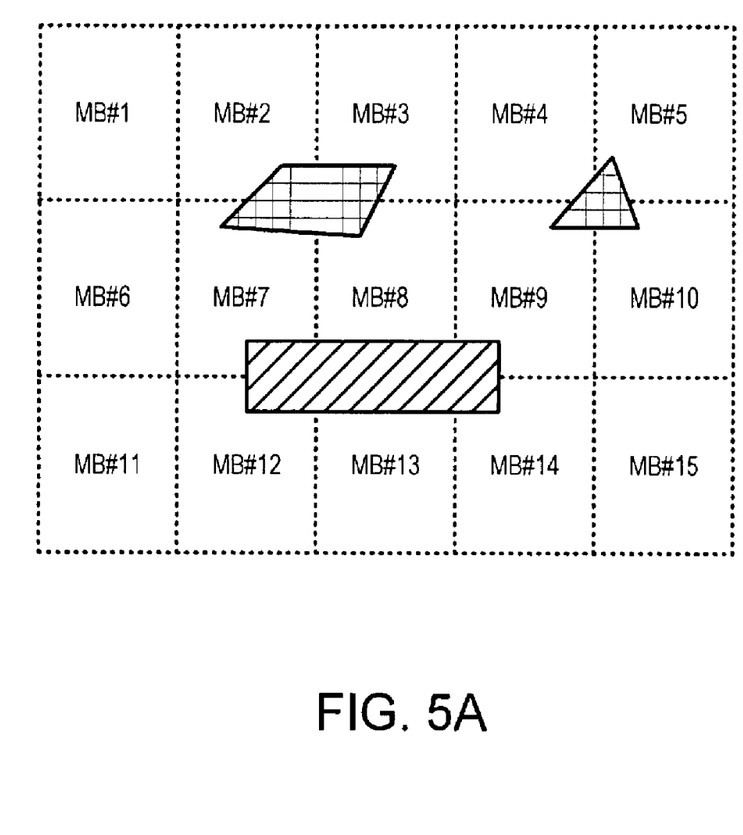
FIG. 5A shows a grid of macroblock boundaries imposed over image shapes when no error occurs.

FIG. 5A shows a grid of macroblock boundaries imposed over image shapes when no error occurs. Three image shapes are displayed to a user in this example. A rhombus occupies parts of four macroblocks MB#2,3,7,8 while a triangle straddles the intersection of four macroblocks MB#4,6,9,10. A rectangle is located along the boundaries of six macroblocks MB#7,8,9,12,13,14.

Since the macroblocks have 16 rows and 16 columns pixels, and only 2 rows and 2 columns are on the macroblock edge, the probability that an edge of an image shape falls exactly along a macroblock edge is only 2 in 16, or about 12%. Of course, image shapes are not necessarily parallel to the macroblock edges. In this simplified example, the image frame has only 15 macroblocks. Typical frames have many more rows and columns of macroblocks.

Figure 5B:
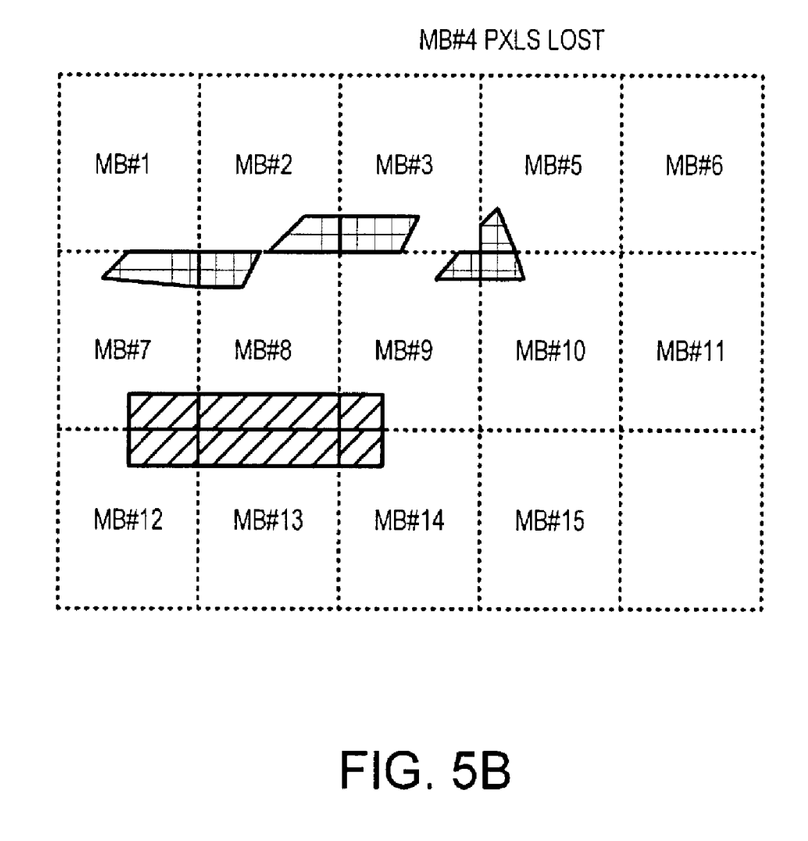
FIG. 5B shows that image shapes are cut by macroblock boundaries when a macroblock sequencing error occurs.

FIG. 5B shows that image shapes are cut by macroblock boundaries when a macroblock sequencing error occurs. In this example, a macroblock sequencing error occurs. Macroblock MB#4 is lost or skipped during decoding, so that macroblock MB#5 is interpreted as MB#4. The macroblock counter is off by one, so that each macroblock after MB#3 is shifted left by one macroblock position, or back to the end of the previous row. For example, MB#6 should be the left-most macroblock of the second row, but instead is shifted to the last macroblock of the first row, where MB#5 should be located.

Image shapes that straddle macroblock boundaries are sliced and shifted when such macroblock sequencing errors occur. For example, the top of the rhombus is correctly located in MB#2,3, but the bottom half of the rhombus is shifted to the left along with MB#7,8. The result is a new bisecting edge of the rhombus along the bottom of macroblocks MB#2,3, and the top of macroblocks MB#7,8.

The data of MB#4 is lost, so a portion of the triangle is missing. This also results in two new edges of the triangle image shape that fall along macroblock boundaries—one new edge between MB#3 and MB#5, and another new edge between MB#3 and MB#9.

When the macroblock sequencing error is not detected, image shapes that are encoded entirely by macroblocks after the sequencing error are shifted in the frame, but do not have new edges. Thus the rectangle is shifted to the left by one column of macroblocks, but does not have any new bisecting edges, as do the rhombus and triangle.

When macroblocks are damaged and the error is detected, the damaged pixels can be hidden or concealed. New image shape edges can still appear along macroblock boundaries, although part of the image shapes may not be displayed.

The inventor detects these new bisecting edges or discontinuities that are caused by macroblock sequencing errors. A sum-of-the-absolute difference (SAD) technique is use to quantify such discontinuities and make a decision on whether such a macroblock-counter sequencing error is present.

Figure 6A:
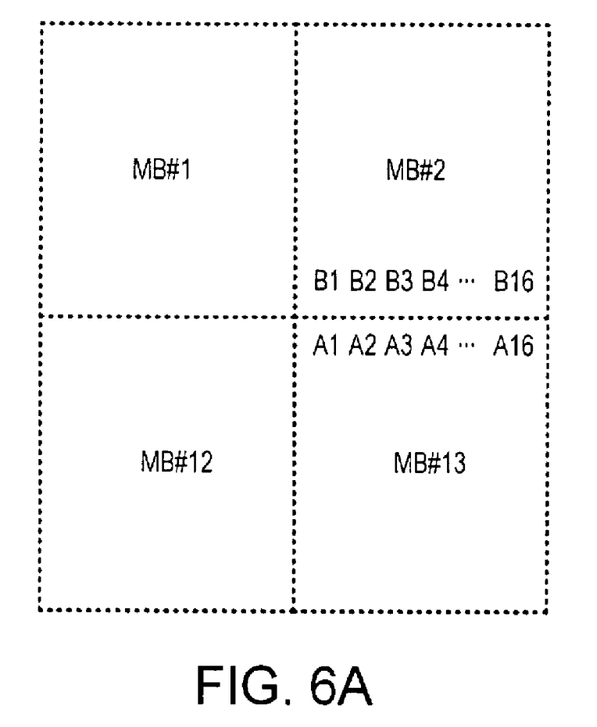
FIGS. 6A,B highlight checking for image errors along macroblock boundaries.
Figure 6B:
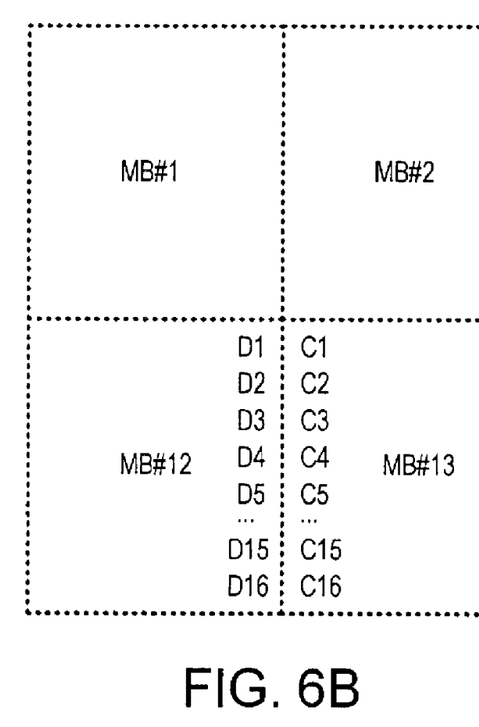

FIGS. 6A,B highlight checking for image errors along macroblock boundaries. FIG. 6A highlights checking for a row-to-row discontinuities along macroblock row boundaries. A current macroblock MB#13 is being decoded. The upper edge of MB#13 meets the lower edge of MB#2 above it. Current MB#13 contains an upper row of sixteen pixels A1, A2, A3 ... A16, while previous-row MB#2 has a lower row of sixteen pixels B1, B2, B3, ... B16.

When no errors are present, it is unlikely that a sharp discontinuity occurs along the macroblock edge. Thus pixel A1 is close in value to pixel B1, pixel A2 is close in value to pixel B2, etc. However, when a sharp discontinuity occurs, pixel A1 has a different color value than adjacent pixel B2 in another macroblock. Likewise, pixel A2 has a different value than pixel B2.

The differences in pixel values along the edge can be quantified using the sum-of-the-absolute difference (SAD). The difference in pixel values of A1 and B1 are generated, and the sign bit dropped to get the absolute difference of pixels A1 and B1. The absolute difference of the other 15 pixel-pairs, such as A2, B2, and A16, B16, are also generated. Finally all 16 absolute differences are summed, to obtain the SAD for this edge.

When a sharp discontinuity occurs along this macroblock boundary, the SAD is large. When no discontinuity or image edge occurs along the macroblock boundary, the SAD is small or even zero. Thus the SAD can be used to quantify the degree of discontinuity.

FIG. 6B highlights checking for discontinuities between adjacent macroblocks in a row. Current macroblock MB#13 is being decoded. The left edge of MB#13 meets the right edge of MB#12 next to it. Current MB#13 contains a leftmost column of sixteen pixels C1, C2, C3 ... C16, while previous-row MB#2 has a rightmost column of sixteen pixels D1, D2, D3, ... D16.

When no error occurs, it is unlikely that an edge of an image shape falls exactly along the edges of macroblock MB#12, 13. However, a sharp discontinuity along the macroblock edge suggest that a macroblock counter error has occurred.

The degree of difference in the pixels C1, C2 ... C16 and D1, D2, ... D6 can be quantified using the sum-of-the-absolute difference (SAD). The SAD for both the upper and left edges of current macroblock MB#13 are calculated as:

$$SAD = \sum_{i=1}^{16} |a_i - b_i| + \sum_{i=1}^{16} |c_i - d_i|$$

The current macroblock is incremented along with the macroblock counter as the macroblocks in the video packet are decoded and their SAD's generated. A maximum SAD can be kept as the macroblocks in the video packet are decoded and their SAD's generated. The SAD's can be generated on the fly as each packet is being decoded, or the error controller can go back and generate the SAD's for the previous packet once a macroblock number mismatch is detected in a new packet.

Figure 7:
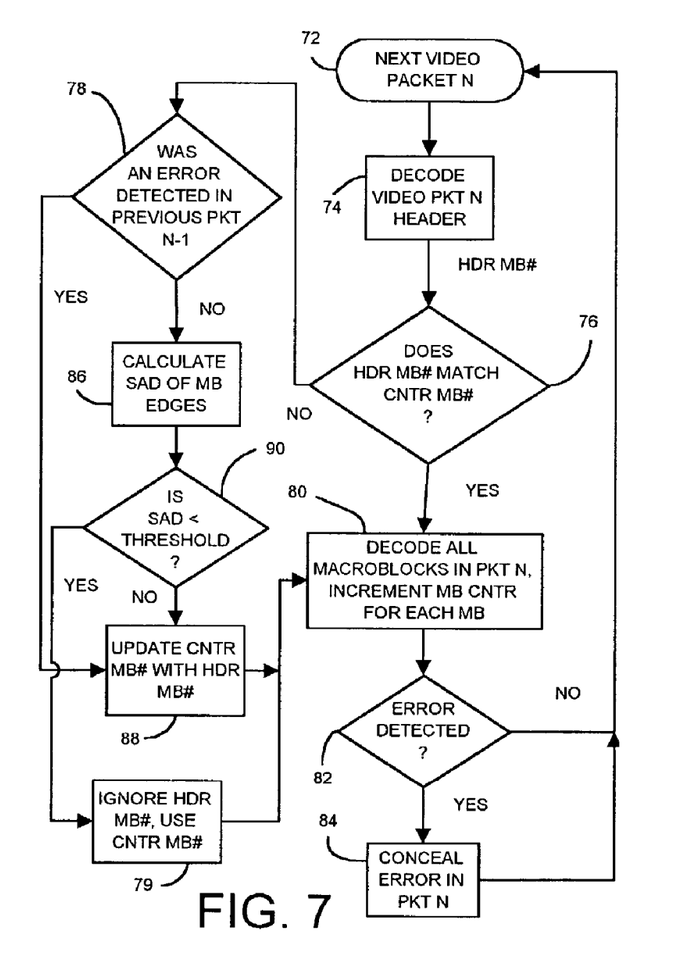
FIG. 7 is a flowchart for error detection by macroblock-border sum-of-absolute-difference threshold comparison.

FIG. 7 is a flowchart for error detection by macroblock-border sum-of-absolute-difference threshold comparison. For each VOP or frame, the MPEG decoder decodes one macroblock after another in order. The macroblocks do not themselves contain a macroblock number or identifier. Instead, the macroblock counter in the decoder is incremented for each macroblock processed.

A new video packet N is detected when a resync marker is found in the bitstream, step 72. The VP header that follows the resync marker is decoded, step 74. This header contains the header macroblock number, which is the number for the first macroblock in the new video packet N. When the video packet is the first video packet in a frame, the header macroblock number is implied to be one, the same value as the reset or initialized macroblock counter.

The decoder compares the header macroblock number that was just read from the VP header to the macroblock counter value, step 76. Most of the time, the values match. Decoding of all the macroblocks in the video packet can proceed, step 80. The macroblock counter is incremented for each macroblock processed.

When an error is detected when decoding the macroblocks in video packet N, step 82, then the decoder may conceal the error, step 84. Errors can be concealed by using pixels from a previous frame rather than the pixels, error terms, or motion vectors encoded with the macroblocks in the video packet. Averaging of surrounding macroblock pixels can also be used to conceal errors. When no decoding errors are detected, and all the macroblocks in packet N have been processed, then decoding can continue with the next video packet, step 72.

Occasionally, the header macroblock number does not match the macroblock counter, step 76. Some kind of error has occurred. When the previous video packet N-1 had a decoding error, step 78, then the error is likely to have caused the macroblock counter to get off count. The header macroblock number is assumed to be correct and the macroblock counter wrong. The header macroblock number in the new video packet N is used to over-write or update the macroblock counter. The header macroblock number is thus loaded into the macroblock counter, step 88. The macroblock counter is then incremented for each macroblock decoded in the current video packet N, step 80.

SAD Used to Decide Whether Header or Macroblock Counter is Wrong

When the macroblock number from the header and the macroblock counter do not match, and the previous packet N-1 did not have a detected decoding error, step 78, then it is not certain whether the macroblock counter or the header is correct. Either the macroblock counter or the header must be in error, since there values do not match (determined earlier in step 76).

The SAD is used to verify the previous video packet. The SAD of each macroblock in the last packet N-1 is calculated, step 86. Macroblock data from earlier packets such as packet N-2 may need to be fetched from a pixel memory since the row above the macroblocks in packet N-1 may be from an earlier packet. When the current macroblock is in the first row of macroblocks, then only the left-edge SAD and not the upper SAD is calculated. Likewise, when the current macroblock is in the first column of macroblocks in the frame, then the left-edge SAD is skipped.

As the SAD for each macroblock in the previous packet N-1 is generated, it's SAD can be accumulated as a running SAD for the packet. Once the last macroblock in the video packet has its SAD generated and accumulated, the accumulated SAD is compared to a threshold, step 90. This threshold value can be set based on experience with similar images, or can be a somewhat arbitrary value. In one embodiment, the threshold is 32×35, or 112. The threshold is set high enough so that error-free images do not have SAD's above the threshold, but the SAD for video packets with macroblock counting errors are above the threshold.

When the maximum SAD is above the threshold, step 90, then there are many discontinuities, more than typical. It is likely that the macroblock counter went off sequence in the last video packet N-1. The macroblock counter is then re-loaded with the header macroblock number, step 88. The macroblocks in the new video packet N can then be decoded, step 80, using the updated macroblock counter value.

When the SAD is below the threshold, step 90, then the image has few discontinuities. It is likely that the correct image was generated when the macroblocks, in the last video packet N-1 were decoded. The error is likely in the new VP header, causing the header macroblock number to be read incorrectly. The header macroblock number is ignored or discarded, while the macroblock counter is used without any update, step 79. The macroblock counter is then incremented for each macroblock decoded in the current video packet N, step 80.

Another error may be detected when decoding the macroblocks in video packet N, step 82. The decoder may conceal the error, step 84, by using pixels from a previous frame rather than the pixels, error terms, or motion vectors encoded with the macroblocks in the current video packet N.

Figure 8:
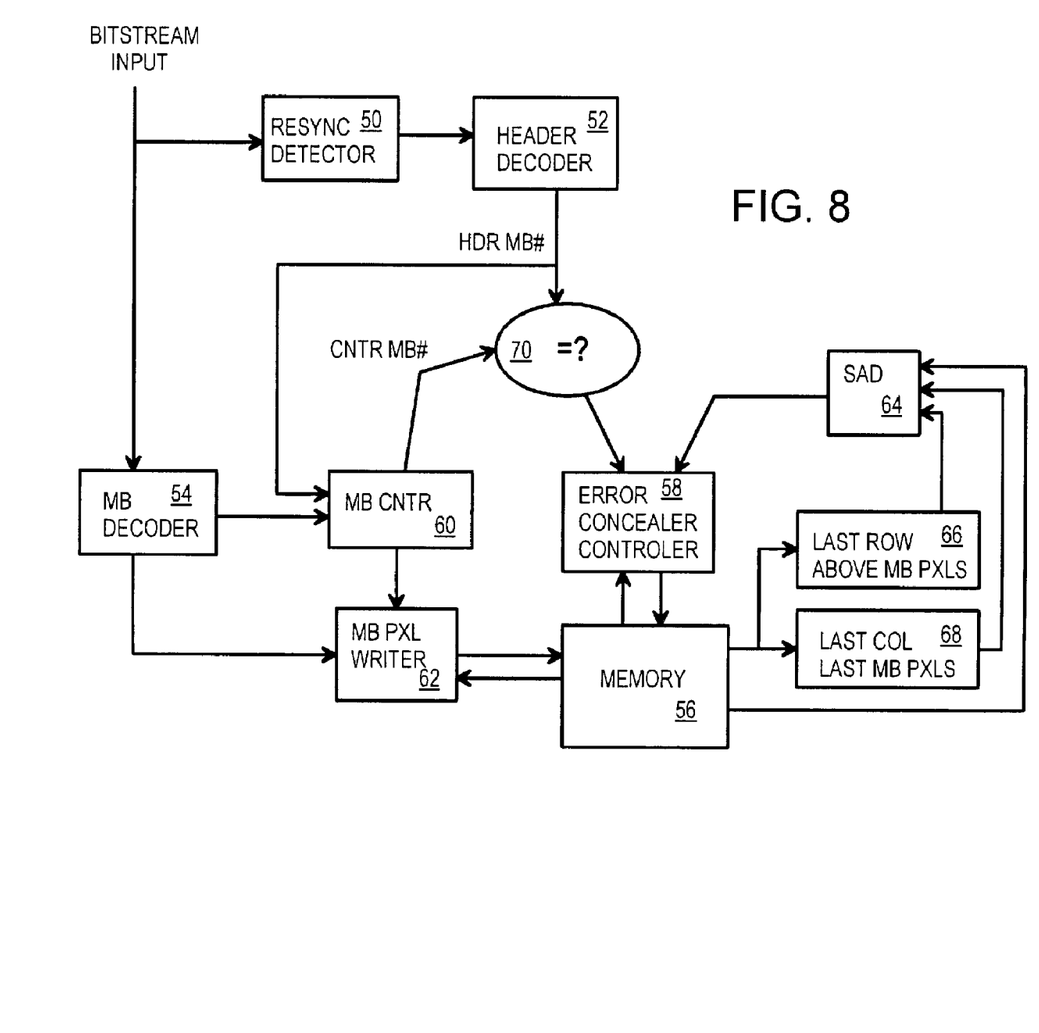
FIG. 8 is a block diagram of an MPEG decoder with error detection using macroblock-border SAD checking.

FIG. 8 is a block diagram of an MPEG decoder with error detection using macroblock-border SAD checking. Many other blocks can be present in an actual MPEG decoder but are not shown for simplicity. Resync detector 50 detects the start of a new video packet and triggers header decoder 52 to decode the VP header. The header macroblock number is read and sent to comparator 70.

Macroblock decoder 54 decodes the macroblocks in the video packet after the VP header and before the next resync marker is detected. Macroblock counter 60 is incremented for each macroblock decoded, and is reset at the start of each new frame or VOP. Macroblock counter 60 may be reset to 1 rather than to 0. Macroblock counter 60 keeps track of which macroblock is being decoded, and instructs pixel writer 62 to write the current macroblock's pixels in the proper location in memory 56 so that the macroblock's pixels appear in the proper location within the frame. Pixel writer 62 may first read pixels from memory 56 from an earlier frame, then translate these pixels to a new location using a motion vector. Error terms may also be added to the pixels read.

Macroblock counter 60 also sends the macroblock number to comparator 70. At the start of a new video packet, when VP header decoder 52 sends the header macroblock number to comparator 70, comparator 70 compares the macroblock numbers from the VP header and macroblock counter 60. At other times comparator 70 is idle, such as when macroblocks are being decoded after the header.

When comparator 70 determines that the headers do not match, error controller 58 is activated. Decoding of new macroblocks by macroblock decoder 54 may be halted until the error is resolved. When an error was also detected in the previous video packet, error controller 58 assumes that the macroblock number in macroblock counter 60 is incorrect. The header macroblock number from VP header decoder 52 is loaded into macroblock counter 60. Decoding of macroblocks can then resume with the updated macroblock count.

When no error was detected in the previous video packet, error controller 58 activates SAD generator 64 to generate the SAD for the macroblocks in the previous video packet. The left column and top row of pixels in each macroblock in the previous packet are fetched from memory 56 and input to SAD generator 64. These pixels can be sent one macroblock at a time, or can be buffered or their SAD's generated in parallel. The pixel data from the last row of the macroblocks above are fetched from last row register 66, while the pixels from the last column of the last macroblock are fetched from register 68. Register 68 can be re-loaded with the current macroblock's first column of pixels after each current macroblock is processed by SAD generator 64. Likewise register 66 can be loaded with the last row of pixels of earlier macroblocks. Alternatively, registers 66, 68 can be deleted when memory 56 is directly accessed for these pixels.

Error controller 58 receives the final SAD from SAD generator 64, and compares the SAD to the threshold. When the SAD is above the threshold, an abnormally large number of discontinuities have been detected. It is likely that an error has already occurred, but was not detected in the previous packet. The macroblock counter may be in error. The header macroblock number from VP header decoder 52 is loaded into macroblock counter 60, allowing decoding of macroblocks in the new video packet to resume with a correct macroblock number. Error controller 58 can also conceal the errors in the previous video packet, such as by using pixels from earlier frames stored in memory 56 and discarding the pixels written to memory 56 by pixel writer 62. Averaging of pixels from surrounding macroblocks can also be used to conceal the error.

When the SAD is below the threshold, relatively few discontinuities have been detected in the previous video packet. It is likely that the previous video packet was correctly processed. It is likely that the macroblock numbers mismatched because the header macroblock number was read incorrectly. Thus the header macroblock number from VP header decoder 52 is ignored. Instead the macroblock number already in macroblock counter 60 is used for identifying macroblocks decoded by macroblock decoder 54 in the new video packet.

Figure 9:
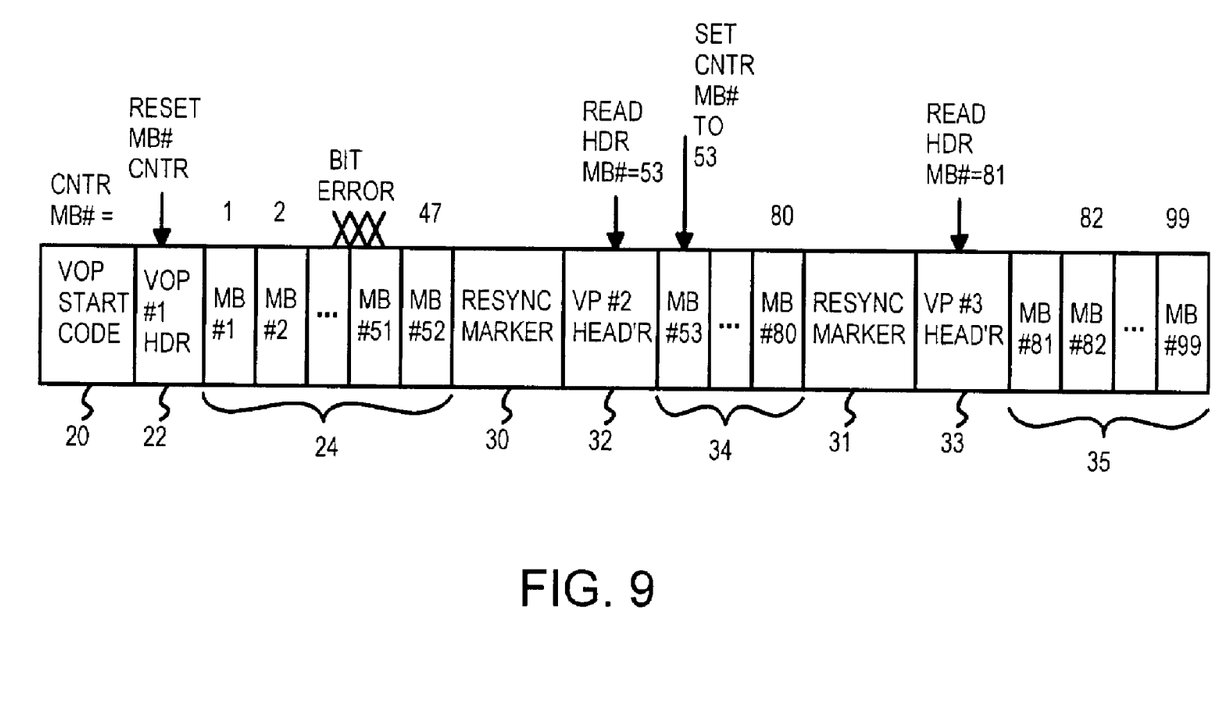
FIG. 9 shows border-SAD detection of a bit error in the macroblock data that corrupts the macroblock counter.

FIG. 9 shows border-SAD detection of a bit error in the macroblock data that corrupts the macroblock counter. Although start code 20 and VOP header 22 for VOP #1 are detected and decoded, a bit error in macroblock data in data field 24 occurs.

Some of the early macroblocks MB#1, MB#2 . . . in data field 24 are properly decoded, but an error occurs before the last macroblock MB#52 in data field 24 is processed. This error is not immediately detected, but the start of some of the macroblocks in data field 24 is not recognized. The decoder combines several macroblocks of data together into a single corrupted macroblock.

Since some of the macroblocks in data field 24 are not recognized, the macroblock counter is not incremented as many times as necessary. The macroblock counter is only incremented for recognized macroblocks. In this example, the macroblock counter is off by 5, reading 47 for the last macroblock MB#52 in data field 24.

Resync marker 30 for the second video packet (VP) is detected, and VP header 32 is decoded. A correct value of 53 is read from VP header 32 as the header macroblock number. The macroblock counter is pre-incremented from 47 to 48, but does not match the header macroblock number of 53. An macroblock-number mismatch error is detected. (Step 76 of FIG. 7) However, since the bit error in data field 24 was not detected, the SAD for the previous video packet is generated to validate the macroblock data in data field 24.

The SAD accumulated for macroblocks MB#1 to MB#52 of the previous video packet #1 is large, since the macroblock data was corrupted. Once the macroblock counter got off count, the remaining macroblocks in the video packet were placed in the wrong relative locations in the frame. Many discontinuities were generated along macroblock boundaries by the mis-placement of macroblocks.

The large SAD is above the threshold, so the error controller assumes that the macroblock counter is wrong. The header macroblock number, 53, read from VP #2 header 32 is loaded into the macroblock counter. The old macroblock counter value of 48 is over-written. Decoding of macroblocks MB#53 to MB#80 in data field 34 continue without error, since the correct macroblock number has been loaded into the macroblock counter. The macroblock counter is incremented for each macroblock, ending video packet #2 with the correct value of 80.

Resync marker 31 is detected, and VP #3 header 33 is decoded. The header macroblock number of 81 is read from VP header 33, and the macroblock counter reads 81 once it is pre-incremented. Since the header and counter macroblock numbers match, macroblocks MB#82 to MB#99 are interpreted correctly as macroblocks #82 to #99.

The SAD allows the error controller to verify the image decoded for the previous video packet. A large SAD value indicates many image edges that coincide with macroblock boundaries. The large SAD thus signals a corrupted image, allowing the header macroblock number to be used. A small SAD indicates a normal image, allowing the macroblock counter to continue to be used.

ALTERNATE EMBODIMENTS

Several other embodiments are contemplated by the inventor. For example the decoders, SAD generator, and error controller can be implemented in a variety of ways, such as by firmware routines in a digital-signal processor (DSP) chip, or in logic in a logic array chip, or as software routines executed by a processor, or a combination of techniques. The decoders, controllers, and comparators can be partitioned in many different ways. A programmable register can allows SAD calculation to be disabled, or allow for different threshold values to be used.

Different formulas can be used besides SAD, such as sum of the square of the difference. The SAD can be applied to fewer than all macroblocks in the previous video packet, or can be generated as the previous macroblock is being decoded rather than after an error is detected. The SAD could be used as a general error-detection technique, even when macroblock number mismatches are not detected.

Other video formats, frame sizes, and macroblock sizes could be supported. Many, other functional blocks can exist in a complex MPEG decoder, and pipelining logic and staging registers may also be present.

Counters can be reset or initialized to values other than zero, such as to 1 or another value. Rather than an increment by 1, larger adjustments could be made, or negative increments or decrements could be used. Various pipelining registers can be added.

When the macroblock data is corrupted, the SAD technique may still be useful. For example, corrupted macroblocks may have all pixels changed to black or white, wiping out any image shapes in the macroblocks. However, discontinuities still can occur on macroblock boundaries with non-corrupted macroblocks, or macroblock that are corrupted in a different way (different colors, etc.). Rather than obtain the maximum SAD, the SAD's for all macroblocks in a video packet can be summed to get an overall SAD for the packet. A running SAD sum can be kept as the macroblocks in the video packet are decoded and their SAD's generated. The running sum SAD can be normalized by dividing by the number of macroblocks. The SAD can exceed the threshold either as a greater than comparison or a greater than or equal comparison.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A macroblock-counting error-detector comprising:
   a macroblock decoder, coupled to a bitstream input, for decoding macroblocks in a bitstream;
   a macroblock counter for counting a number of macroblocks decoded from the bitstream;
   a header decoder, coupled to the bitstream input, for decoding a packet header that includes a header macroblock number;
   a count comparator, coupled to the macroblock counter and to the header decoder, for comparing the header macroblock number to a macroblock count from the macroblock counter;
   an error controller, activated by the count comparator, for controlling over-writing of the macroblock counter by the header macroblock number to recover from a macroblock counting error;

a discontinuity calculator, responsive to the error controller, receiving edge pixels from at least two macroblocks, the edge pixels being along at least one common edge between the at least two macroblocks, for calculating a degree of pixel discontinuity; and a discontinuity comparator for comparing the degree of pixel discontinuity from the discontinuity calculator to a threshold, the error controller over-writing the macroblock counter with the header macroblock number when the threshold is met, whereby the degree of pixel discontinuity controls over-writing of the macroblock counter with the header macroblock number.

2. The macroblock-counting error-detector of claim 1 wherein the header macroblock number indicates a first macroblock in a next video packet after a packet containing the macroblocks having the edge pixels, whereby the degree of pixel discontinuity is calculated for macroblocks in a previous packet before the header macroblock number.

3. The macroblock-counting error-detector of claim 2 further comprising:

a start-code detector, coupled to the bitstream input, for detecting a start code at a beginning of a new frame;

wherein the macroblock counter is initialized when the start code for the new frame is decoded from the bitstream, whereby the macroblock counter is initialized for each new frame.

4. The macroblock-counting error-detector of claim 3 further comprising:

a resync detector, coupled to the bitstream input, for detecting a resync marker at a beginning of a video packet, the resync detector activating the header decoder when the resync marker is detected.

5. The macroblock-counting error-detector of claim 4 wherein the discontinuity calculator generates a sum-of-the-absolute difference (SAD) of pixels along macroblock boundaries.

6. The macroblock-counting error-detector of claim 5 wherein the discontinuity calculator generates a maximum SAD for all macroblocks in a video packet, the maximum SAD being the degree of pixel discontinuity.

7. The macroblock-counting error-detector of claim 6 wherein the error controller over-writes the macroblock counter with the header macroblock number when the macroblock decoder detects a decoding error in a previous video packet.

8. A method for detecting a macroblock sequencing error comprising:

decoding a packet header that follows a resync marker for a new video packet in a frame;

comparing a header macroblock number read from the packet header to a macroblock count;

when the header macroblock number matches the macroblock count, decoding macroblocks in the new video packet and incrementing the macroblock count for each macroblock decoded;

when the header macroblock number does not match the macroblock count, and when an error was detected in a previous packet, updating the macroblock count with the header macroblock number and decoding macroblocks in the new video packet and incrementing an updated macroblock count for each macroblock decoded;

when the header macroblock number does not match the macroblock count, and when no error was detected in a previous packet;

calculating a pixel difference between adjoining macroblocks in the previous packet;

comparing the pixel difference to a threshold;

when the pixel difference exceeds the threshold, updating the macroblock count with the header macroblock number and decoding macroblocks in the new video packet and incrementing the updated macroblock count for each macroblock decoded; and when the pixel difference does not exceed the threshold, not updating the macroblock count, decoding macroblocks in the new video packet and incrementing the macroblock count for each macroblock decoded, whereby the header macroblock number updates the macroblock count when the pixel difference exceeds the threshold upon a mismatch with the macroblock count.

9. The method of claim 8 wherein calculating the pixel difference comprises:

generating a pixel difference between a first pixel in a first macroblock and a second pixel in a second macroblock, the first and second pixels being adjacent to each other but in different macroblocks;

generating pixel differences for other first and second pixels along a boundary between the first and second macroblocks; and summing the pixel differences to generate the pixel difference compared to the threshold, whereby differences among pixels along macroblock boundaries are summed.

10. The method of claim 9 further comprising:

determining a maximum pixel difference for macroblocks in the previous packet;

wherein comparing the pixel difference to a threshold comprises comparing the maximum pixel difference to the threshold, whereby the maximum pixel difference is compared.

11. The method of claim 10 further comprising:

obtaining an absolute value of the pixel differences before summing the pixel differences, whereby the pixel difference compared is a sum of absolute difference (SAD).

12. The method of claim 9 wherein generating pixel differences along the boundary between the first and second macroblocks comprises generating pixel differences along a left edge of the first macroblock;

further comprising:

generating an upper sum of upper pixel differences with a third macroblock above the first macroblock for an upper edge of the first macroblock;

adding the upper sum when summing pixel differences before comparison, whereby pixel difference for left and upper edges of the first macroblock are summed.

13. The method of claim 8 further comprising:

detecting an error when decoding macroblocks in the video packet;

concealing the error detected when decoding the macroblocks in the video packet, whereby detected macroblock errors are concealed.

14. An motion-picture-experts group (MPEG) decoder comprising:

a resync detector, coupled to receive a bitstream, for detecting a resync marker at a beginning of a video-packet;

header means, activated by the resync detector, for decoding a video-packet header in the bitstream after the resync marker, the header means extracting a header macroblock number that identifies a location within a frame for a first macroblock after the video packet header;

decoder means, coupled to receive macroblocks in the bitstream after the video packet header, for decoding pixel data for each macroblock;

macroblock counter means, coupled to the decoder means, for counting a number of macroblocks in the frame, the macroblock counter means having a counter value;

header compare means, coupled to the macroblock counter means and to the header means, for signaling when the counter value mismatches the header macroblock number;

boundary means, receiving edge pixels from two adjacent macroblocks, for calculating a pixel-difference measurement that indicates an image change across a boundary between the two adjacent macroblocks, the edge pixels being along the boundary;

threshold means, coupled to the boundary means, for determining when the pixel-difference measurements have met a threshold value for indicating a macroblock counting error; and error means, coupled to the threshold means, for writing the header macroblock number from the header means to the macroblock counter means to update the counter value with the header macroblock number when the macroblock counting error is detected, whereby macroblock counting errors are detected and the macroblock counter means updated to recover from the macroblock counting error.

15. The MPEG decoder of claim 14 further comprising:
a pixel memory for storing pixels for macroblocks in the frame, the boundary means receiving edge pixels from the pixel memory.

16. The MPEG decoder of claim 15 further comprising:
error conceal means, activated by the error means when the macroblock counting error is detected, for overwriting pixels in macroblocks in at least one of the two adjacent macroblocks to conceal the macroblock counting error.

17. The MPEG decoder of claim 16 wherein the pixel data for each macroblock comprises a motion vector, an error term, or pixels in the macroblock.

18. The MPEG decoder of claim 17 wherein the boundary means comprises a calculation means for generating a sum-of-the-absolute difference (SAD) of the edge pixels.

19. The MPEG decoder of claim 18 wherein the boundary means calculates the SAD for several macroblocks in a previous video packet;

wherein the boundary means further comprises maximum means for storing a maximum SAD for the several macroblocks in the previous video packet, whereby the maximum SAD is compared to the threshold value.

20. The MPEG decoder of claim 19 wherein the SAD is generated by combining an SAD for a horizontal edge and an SAD for a vertical edge of each macroblock.

* * * * *